United States Patent [19]
Horvath et al.

[11] Patent Number: 6,045,325
[45] Date of Patent: Apr. 4, 2000

[54] APPARATUS FOR MINIMIZING INLET AIRFLOW TURBULENCE IN A GAS TURBINE ENGINE

[75] Inventors: Lajos H. Horvath, Palm Beach Gardens; Waclaw I. Surowka, Jupiter, both of Fla.

[73] Assignee: United Technologies Corporation, Hartford, Conn.

[21] Appl. No.: 08/993,822

[22] Filed: Dec. 18, 1997

[51] Int. Cl.[7] ............................. F01D 17/16; F01D 11/00
[52] U.S. Cl. ..................... 415/161; 415/160; 415/230; 415/231; 277/637; 277/645
[58] Field of Search ..................... 415/148, 151, 415/159, 160, 161, 162, 170.1, 174.2, 230, 231; 277/630, 637, 641, 642, 645, 651, 652

[56] References Cited

U.S. PATENT DOCUMENTS

| | | | |
|---|---|---|---|
| 1,998,791 | 4/1935 | Schanz | 277/645 |
| 2,230,303 | 2/1941 | Leguillon | 277/645 |
| 2,230,688 | 2/1941 | Irwin | 277/645 |
| 2,814,517 | 11/1957 | Razdow | 277/645 |
| 2,906,552 | 9/1959 | White | 277/652 |
| 2,910,209 | 10/1959 | Nelson | 277/645 |
| 3,375,016 | 3/1968 | Jellinek et al. | 277/645 |
| 3,990,810 | 11/1976 | Amos et al. | 415/161 |
| 4,448,430 | 5/1984 | Bright | 277/645 |
| 5,494,301 | 2/1996 | Hamilton et al. | 277/652 |

*Primary Examiner*—Christopher Verdier
*Attorney, Agent, or Firm*—Christopher T. Hayes

[57] ABSTRACT

A seal, and method of using same, for an inlet guide vane in a gas turbine engine includes a longitudinally extending tubular portion that has a longitudinal axis defined therethrough, a dovetail portion including a rib portion and a retaining feature. The rib portion is integral with the tubular portion and extends parallel to the axis, and the rib portion extends in a direction radially outward from the axis. The retaining feature is integral with the rib portion and tapers toward the axis.

6 Claims, 6 Drawing Sheets

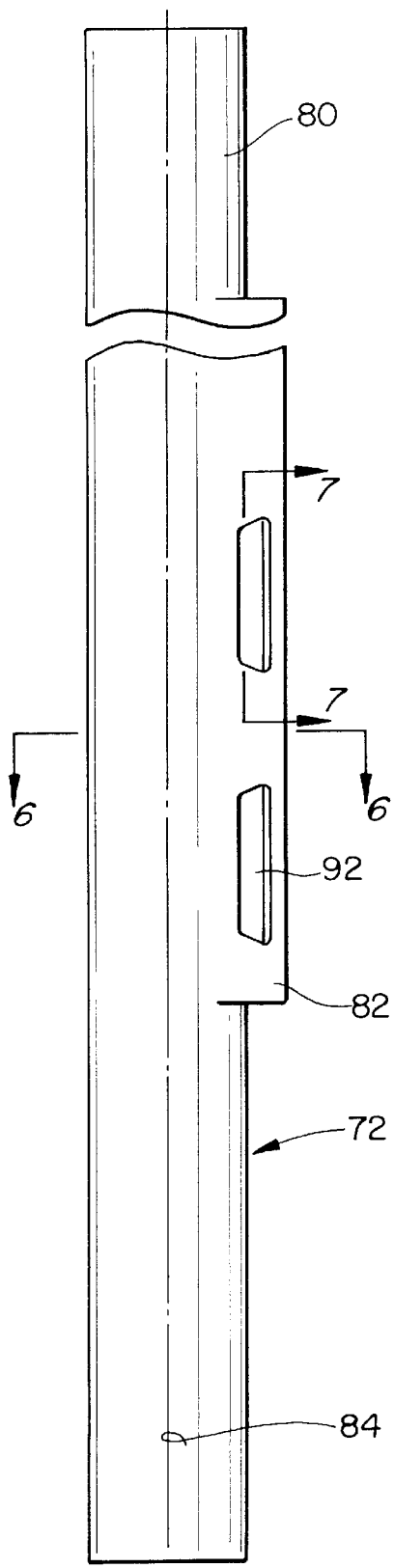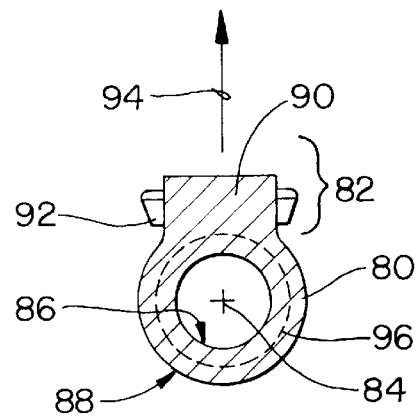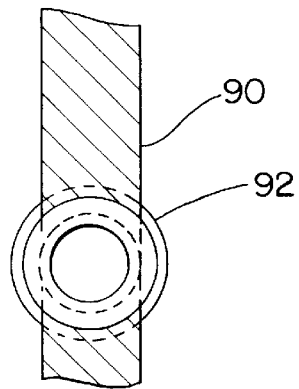

APPARATUS FOR MINIMIZING INLET AIRFLOW TURBULENCE IN A GAS TURBINE ENGINE

The invention was made under a U.S. Government contract and the Government has rights herein.

DESCRIPTION

1. Field of the Invention

This invention relates to gas turbine engines, and specifically to compressors thereof having selectively positionable inlet guide vanes for directing the flow of airflow entering the engine.

2. Background of the Invention

In aircraft gas turbines engines, such as the type shown in FIG. 1, compressors 10 are used to compress the air 12 entering the gas turbine engine 14. For maximum efficiency the airflow 12 entering the upstream end 16 of the compressor 10 must impinge the fan blades 18 of the compressor 10 at a precise orientation relative to the longitudinal axis 20 of the engine 14. The precise orientation is determined by the design of the engine 14 and the conditions at which the engine is operated. In order to optimize performance at a number of different operating conditions, many gas turbine engines include a mechanism for selectively controlling the angle at which the incoming air 12 impinges the first stage of compressor blades 18.

As shown in FIG. 1, a gas turbine engine 14 includes one or more rotor shafts 22 which are suitably supported by annular frames. Typically, a fan 18 is joined to a fan shaft 22 that is supported at its forward end in a fan inlet case. The fan inlet case includes an annular outer casing 24 and an inner shroud 26, and a plurality of circumferentially spaced apart struts 28 extending therebetween. The struts 28 are fixed relative to the inner shroud 26 and the casing 24.

The struts 28 are aerodynamically shaped to direct air 12 entering the engine inlet 30 efficiently between adjacent struts 28 prior to reaching the fan 18. Such struts 28 are hereinafter referred to as "strut airfoils". Bearing 36, whose housing is attached to the inner shroud 26 of the fan inlet case supports the rotating fan shaft 22. The loads from the fan shaft 22 are transmitted through the inner shroud 26 and strut airfoils 28 to the annular casing 24.

Since the air angle of impingement onto the fan blade varies as a function of the conditions at which the engine 14 is being operated, selectively positionable flaps 32 are positioned upstream of the compressor blades 18 to direct the incoming air 12 to the fan stage 18 of the compressor. Such flaps 32 are hereinafter referred to as "flap airfoils". As shown in FIG. 2, each flap airfoil 32 is positioned immediately downstream of one of the strut airfoils 28 relative to the incoming airflow 12. These flap airfoils 32 are rotatable about a reference axis, and such rotation varies the angle at which the incoming airflow impinges the blades of the fan stage 18 of the compressor 10. Together, the strut airfoil 28 and the flap airfoil 32 immediately downstream thereof form an inlet guide vane.

For optimum engine operating efficiency and stability, it is important that a smooth airflow transition occurs between the strut airfoil 28 and the flap airfoil 32 immediately downstream thereof at all engine operating conditions. However, in some designs of the prior art, the inlet guide vanes introduce turbulence into the airflow at certain rotational positions of the flap airfoil. This turbulence is sufficient to cause a nonintegral rotor blade vibration known as "flutter" in the blades of the fan immediately downstream of the inlet guide vanes. In severe cases, the flutter may damage a fan blade, shorten its useable life, or restrict operation of the engine. As those skilled in the art will readily appreciate, any condition which could impair normal engine operation while the aircraft is in flight, should be avoided.

What is needed is a means for minimizing the amount of turbulence introduced into the airflow as air flows through the inlet guide vanes to the fan.

SUMMARY OF THE INVENTION

An object of the present invention is to provide a seal for an inlet guide vane that is located in the gap between the strut airfoil and the flap airfoil to prevent the flow of air through the gap.

Another object of the present invention is to provide a method of preventing turbulence in airflow entering the fan of a gas turbine engine.

Accordingly, the present invention provides a seal for an inlet guide vane which includes a longitudinally extending tubular portion, that has a longitudinal axis defined therethrough, a dovetail portion including a rib portion and a retaining feature. The rib portion is integral with the tubular portion and extends parallel to the axis, and the rib portion extends in a direction radially outward from the axis. The retaining feature is integral with the rib portion and tapers toward the axis. The invention further provides a method for using the seal to prevent flutter in the fan blades of a gas turbine engine.

The foregoing and other features and advantages of the present invention will become more apparent from the following description and accompanying drawings.

BRIEF DESCRIPTION OF THE DRAWINGS

FIG. 5 is a side view of the seal of the present invention.

FIG. 6 is a cross sectional view of the seal of the present invention taken along line 6—6 of FIG. 5.

FIG. 7 is a cross sectional view of the seal of the present invention taken along line 7—7 of FIG. 5.

DESCRIPTION OF THE PREFERRED EMBODIMENT OF THE PRESENT INVENTION

Air flowing past an inlet guide vane has a tendency to flow from the pressure side of the inlet guide vane to the suction side of the inlet guide vane. The inventors have discovered that this tendency is great enough to cause air flowing past an inlet guide vane to flow through the gap between the strut airfoil and the flap airfoil thereof. The inventors have further determined that this flow of air through the gap can cause separation of the airflow from the suction side of the inlet guide vane, which introduces turbulence into the airflow entering the fan blades. It is this turbulence that can cause the blades of the fan to flutter and ultimately fail at certain engine operating conditions.

Figure 1:
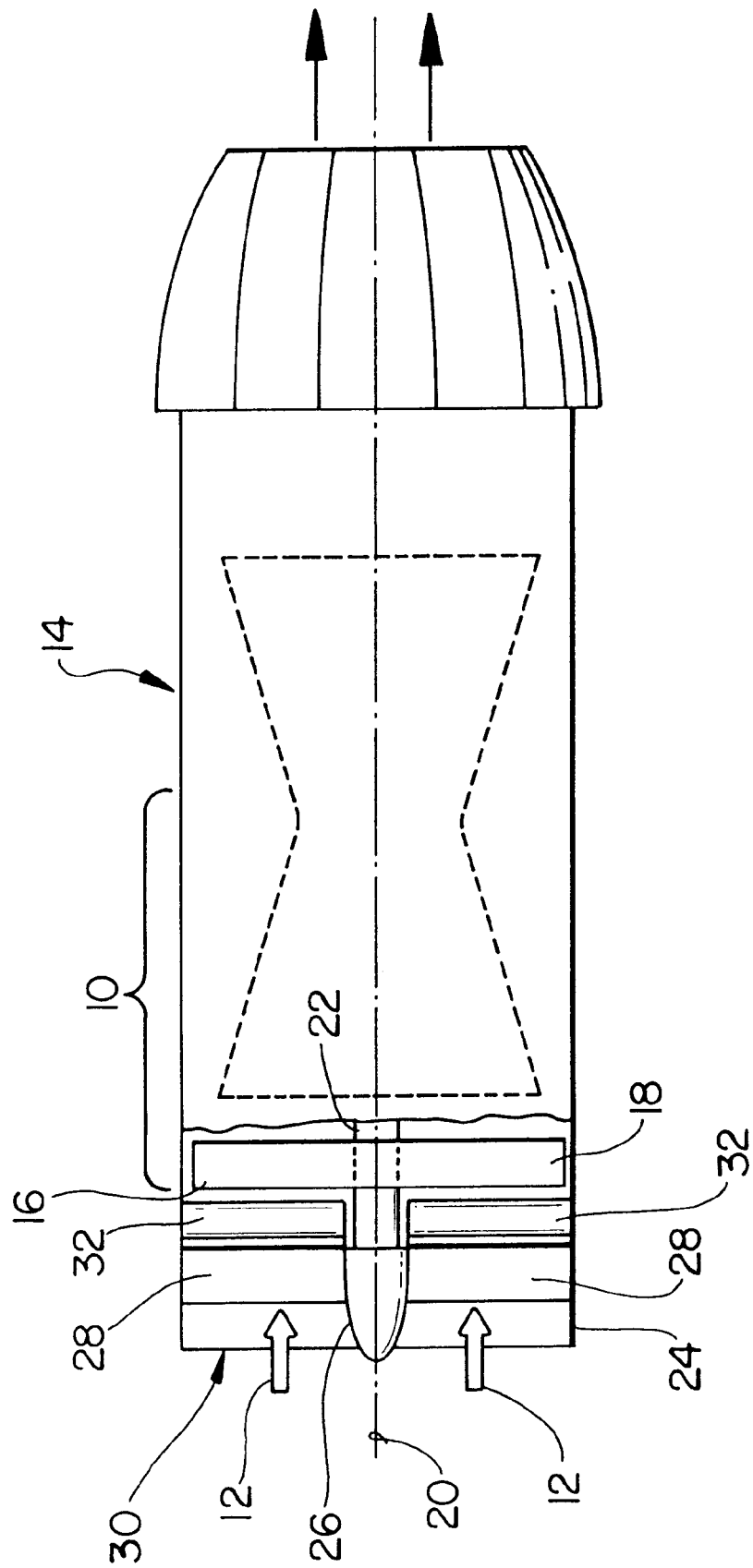
FIG. 1 is a schematic view of a gas turbine engine of the prior art.
Figure 2:
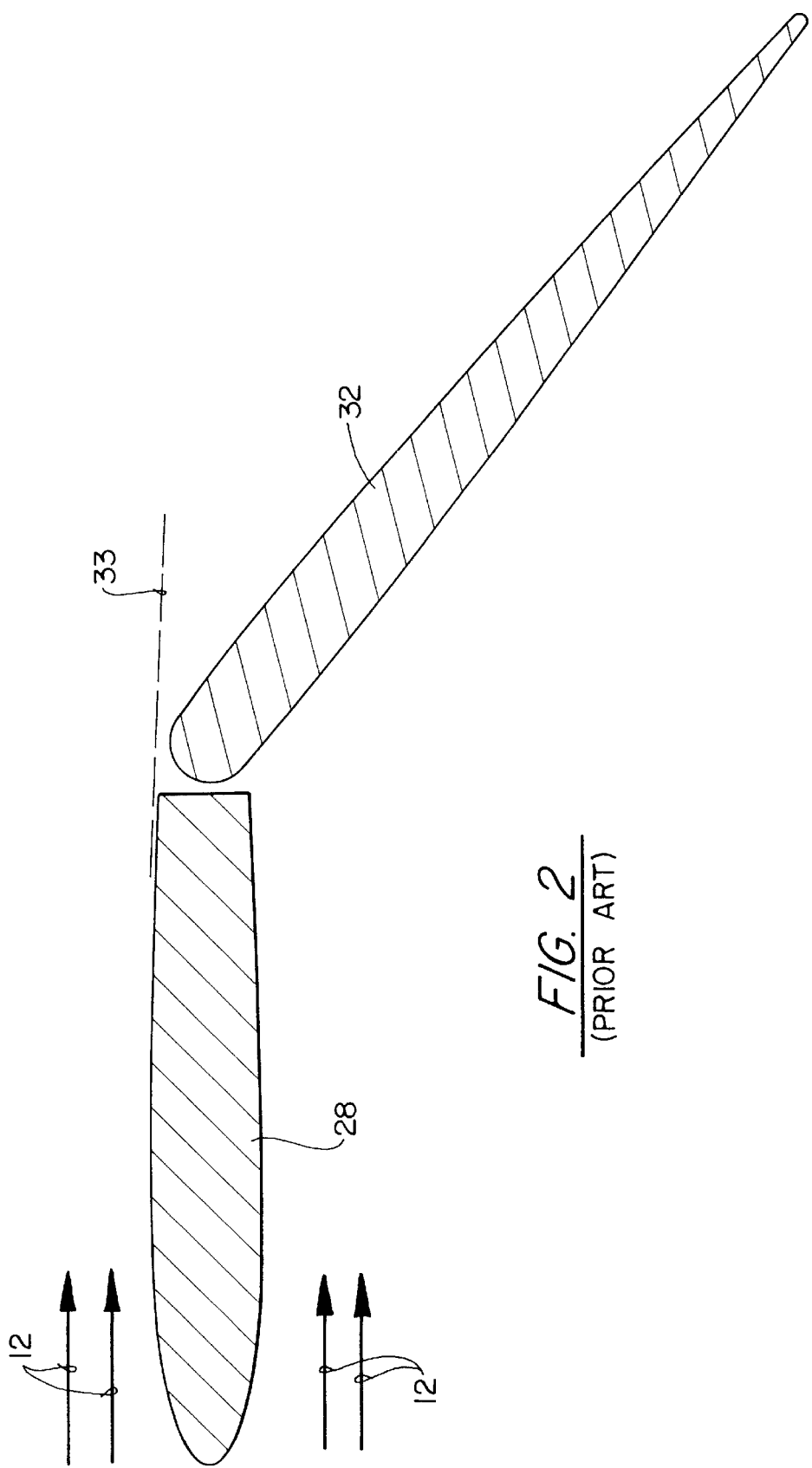
FIG. 2 is a cross sectional view of a guide vane of the prior art.
Figure 3:
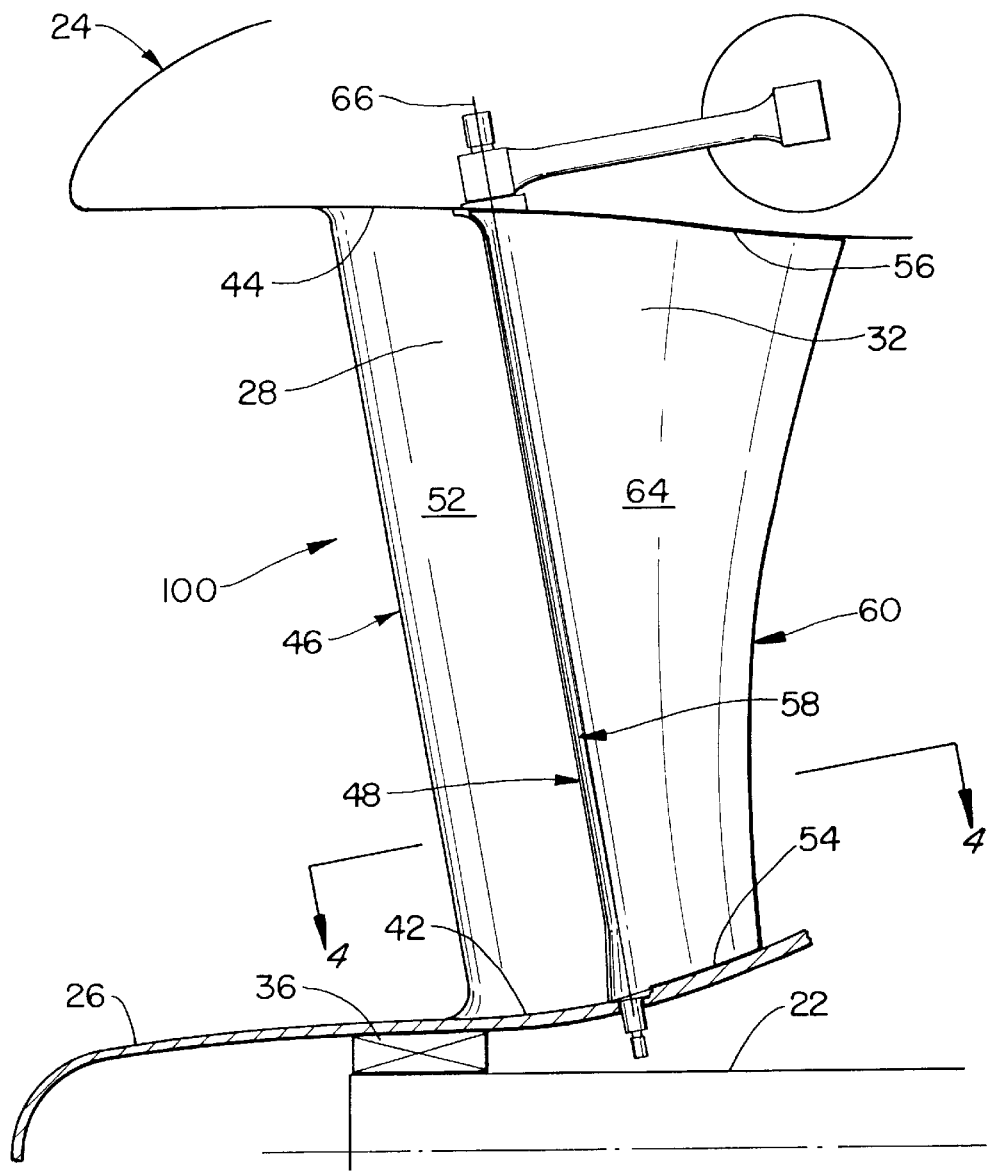
FIG. 3 is a partial cross sectional view of an engine inlet showing an inlet guide vane.

An inlet guide vane 100 of the present invention is shown in FIG. 3 in the inlet of a gas turbine engine. As those skilled in the art will readily appreciate, the inlet comprises an inner shroud 26 and an annular casing 24 spaced radially outward from the inner shroud 26. A plurality of inlet guide vanes 100 extend radially from the inner shroud 26 to the casing 24.

Each inlet guide vane includes both a strut airfoil 28 and a flap airfoil 32. The strut airfoils 28, which are preferably spaced uniformly about the circumference of the inner shroud 26, structurally support the annular casing 24 in spaced relation to the inner shroud 26. Accordingly, each of the strut airfoils 28 is fixedly secured to the inner shroud 26 and the casing 24. As in the prior art, the strut airfoils 28 are aerodynamically shaped to deflect air entering the inlet 30 around the strut airfoil 28. Immediately downstream of each strut airfoil 28 is a flap airfoil 32, as shown in FIG. 3.

Figure 4:
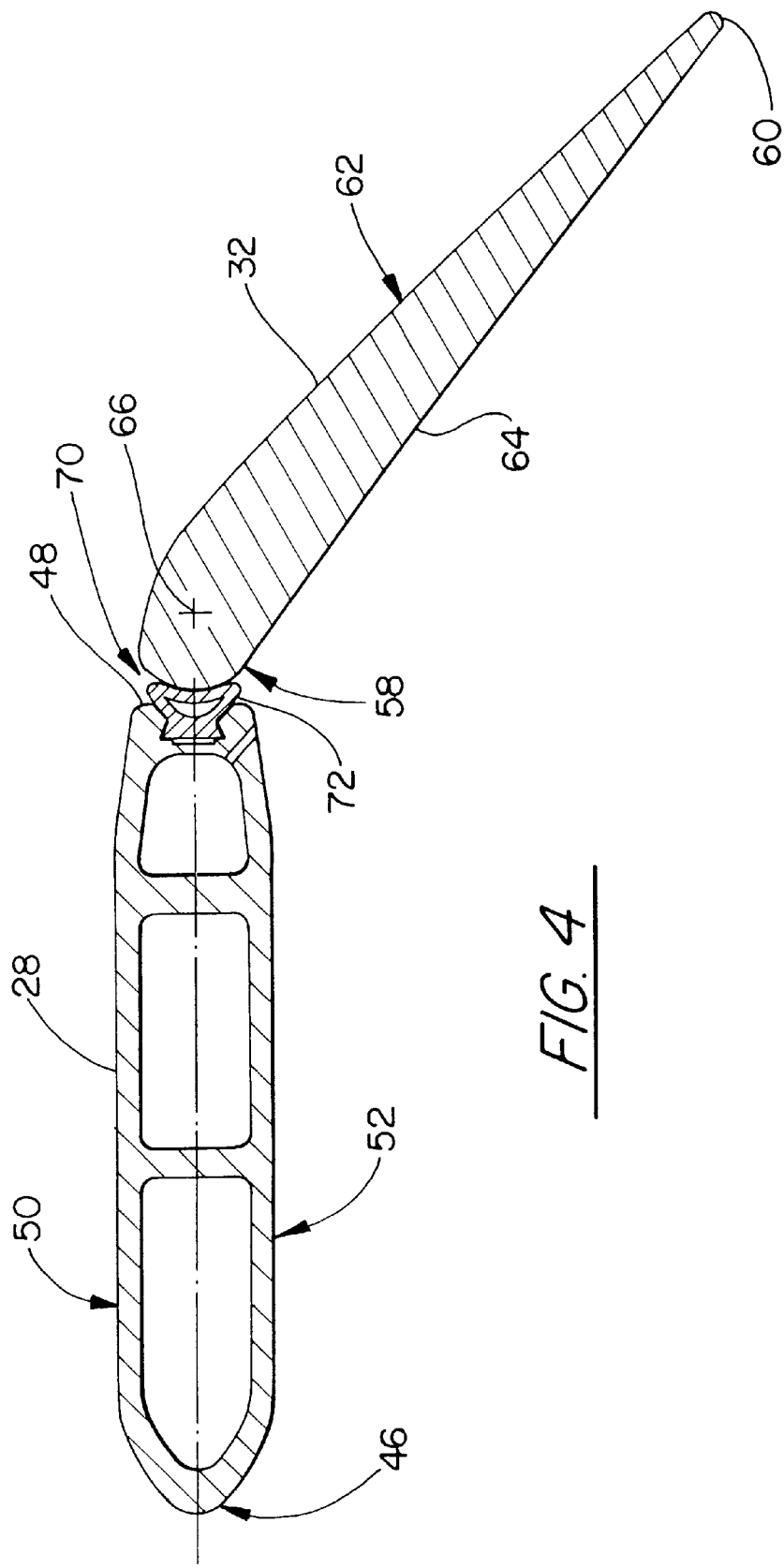
FIG. 4 is a cross sectional view of an inlet guide vane incorporating the seal of the present invention.

Each of the strut airfoils 28 has a strut first end 42 adjacent the inner shroud 26, and a strut second end 44 in spaced relation to the first end 42 and adjacent to the annular casing 24. Additionally, each of the strut airfoils 28 has a strut leading edge surface 46 and a strut trailing edge surface 48. As shown in FIGS. 3 and 4, first 50 and second 52 strut airfoil surfaces extend from the strut leading edge surface 46 to the strut trailing edge surface 48 and from the strut first end 42 to the strut second end 44 thereof, and as shown in FIG. 4, the first and second strut airfoil surfaces 50, 52 are in spaced relation to each other.

Referring again to FIG. 3, each of the flap airfoils 32 has a flap first end 54 adjacent the inner shroud 26, and a flap second end 56 in spaced relation to the first end 54 and adjacent to the annular casing 24. Additionally, each of the flap airfoils 32 has a flap leading edge surface 58 and a flap trailing edge surface 60. Referring to FIGS. 3 and 4, first 62 and second 64 flap airfoil surfaces extend from the flap leading edge surface 58 to the flap trailing edge surface 60 and from the flap first end 54 to the flap second end 56 thereof, and as shown in FIG. 4, the first and second flap airfoil surfaces 62, 64 are in spaced relation to each other.

Each flap airfoil 32 is rotatable about a reference axis 66 relative to the strut airfoil 28 immediately upstream thereof. This reference axis 66, or "trunion axis", is fixed relative to the strut airfoil 28. The leading edge surface 58 of each flap airfoil 32 is in spaced relation to the trailing edge surface 48 of the strut airfoil 28 immediately upstream thereof, defining a gap 70 therebetween.

Located in the gap 70 of each inlet guide vane, and preferably secured to the trailing edge surface 48 of the strut airfoil 28 thereof, is an inlet guide vane seal 72, as shown in FIG. 4. The seal 72 of each inlet guide vane 100 extends from the trailing edge surface 48 of the strut airfoil 28 to the leading edge surface 58 of the flap airfoil 32 immediately adjacent thereto, thereby preventing the flow of air through the gap 70. As shown in FIG. 5, the seal 72 has a longitudinally extending tubular portion 80 and a dovetail portion 82, and a longitudinal axis 84 extends the length of the tubular portion 80. The tubular portion 80 includes first and second surfaces 86, 88, and both surfaces 86, 88 are in spaced relation to the longitudinal axis 84, as shown in FIG. 6. The second surface 88 is located radially outward from the first surface 86 relative to the longitudinal axis 84, and the second surface 88 is covered with a lubricious material, such as Teflon TM. As used herein, the term "lubricious material" means a material that having a coefficient of friction not greater than 0.04 when in contact with the flap airfoil leading edge surface 58.

The dovetail portion 82 includes a rib portion 90 that is integral with the tubular portion 82, and a retaining feature 92 for securing the seal 72 to the trailing edge 48 of a strut airfoil 28, as shown in FIG. 7. Preferably, the retaining feature 92 is a tapered washer, as shown in FIG. 5. The rib portion 90 extends along the tubular portion 80 parallel to the longitudinal axis 84, and the rib portion 90 also extends in a direction 94 radially outward from the longitudinal axis 84. The tubular portion 80 and the rib portion 90 are made of an elastomeric material, such as silicone rubber. For durability, the tubular portion 80 includes a reinforcing fiber mesh 96 embedded therein between the first and second surfaces 86, 88. As shown in FIGS. 5–7, the retaining feature 92 is integral with the rib portion 90 and tapers toward the longitudinal axis 84. The retaining feature 92, which is made of a rigid material such as titanium or aluminum, is preferably embedded into the rib portion 90 of the seal 72.

Figure 8:
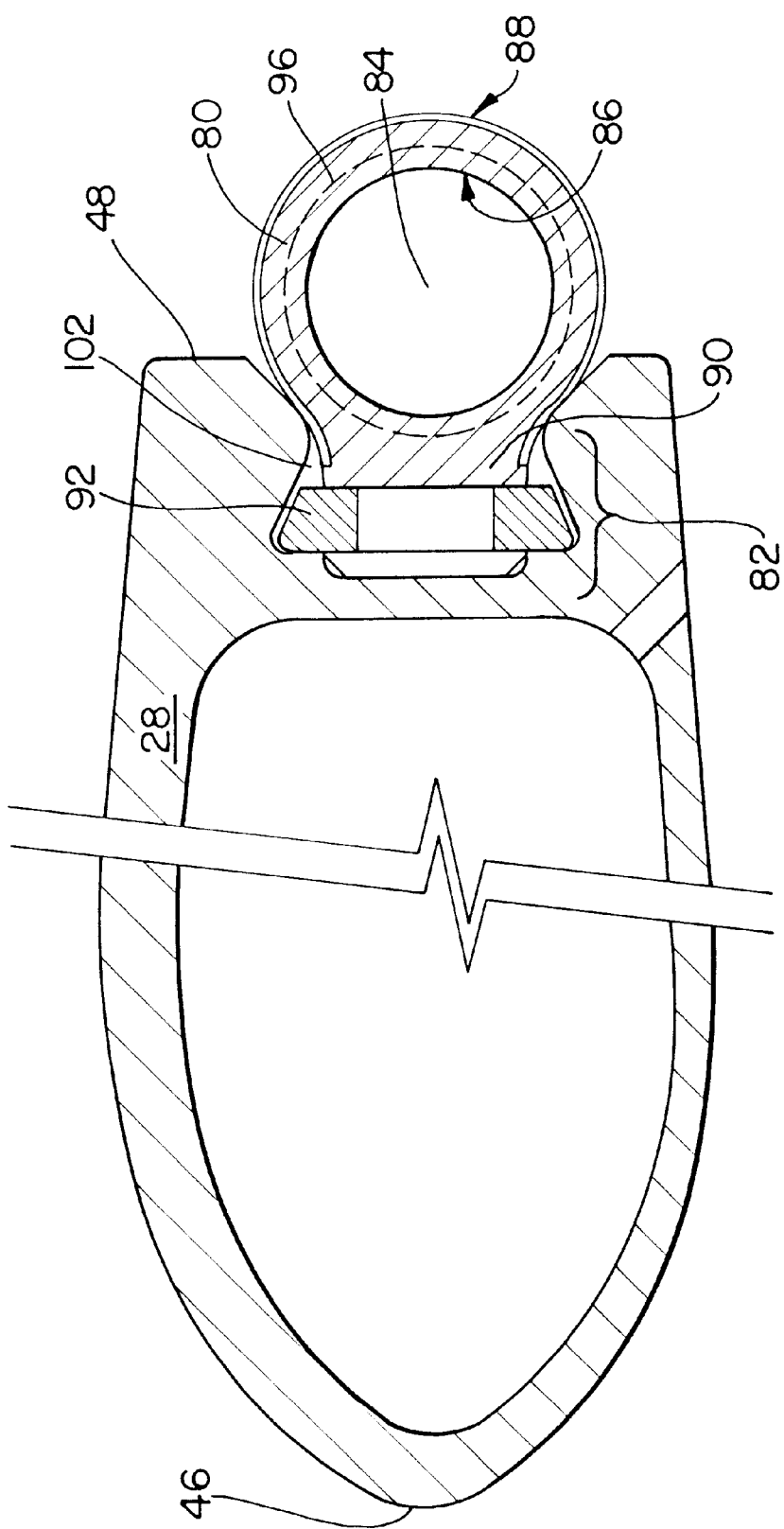
FIG. 8 is a cross sectional view similar to the view of FIG. 6 showing the seal of the present invention retained in the retaining slot of the strut airfoil in the free state prior to the flap airfoil installation.

As shown in FIG. 8, the trailing edge 48 of the strut airfoil includes a retaining slot 102 that tapers in a direction away from the leading edge 46 of the strut airfoil 28. The slot 102 extends the length of the trailing edge 48, and dovetail portion 82 must be slid into the slot from one of the ends 42, 44 of the strut airfoil 28. The width of the slot 102 is only slightly greater than width of the retaining feature 92 so that once the dovetail portion 82 is received therein, the seal can only be detached from the strut airfoil 28 by sliding the retaining feature 92 out one of the ends 42, 44 of the strut airfoil 28.

In operation, air flowing past the inlet guide vanes 100 is prevented from passing through the gap 70 between each flap airfoil 32 and the strut airfoil 28 immediately upstream thereof. Thus, the mechanism described above that causes separation on the suction side of the inlet guide vanes is eliminated, thereby preventing the turbulence that can result from such separation. Accordingly, the fan blades immediately downstream of the inlet guide vanes are not subjected to the type of airflow distortions that cause the flutter and associated engine damage described above.

The method and seal of the present invention minimizes turbulence in the airflow entering the fan by eliminating the cause of airflow separation at the inlet guide vane. The present invention thus prevents the detrimental effect that flutter can have on the fan of gas turbine engines at certain engine operating conditions.

Although the invention has been shown and described with respect to a preferred embodiment thereof it should be understood by those skilled in the art that other various changes and omissions in the form and detail of the invention may be made without departing from the spirit and scope thereof.

We claim:

1. A method for preventing turbulence in air entering a fan of a gas turbine engine, said method comprising:

providing an engine inlet, said inlet having an inner shroud, an annular casing spaced radially outward from the inner shroud, and a plurality of inlet guide vanes extending radially from the inner shroud to the casing, each of said guide vanes including a strut airfoil and a flap airfoil, said strut airfoil of each inlet guide vane in spaced relation to said flap airfoil thereof defining a gap therebetween, said flap airfoil of each inlet guide vane rotatable about a reference axis relative to said strut airfoil thereof; and, providing a seal in each inlet guide vane, each seal comprising a longitudinally extending tubular portion, said tubular portion having a longitudinally extending axis defined therethrough, the tubular portion comprising first and second surfaces, said surfaces in spaced relation to said axis, and said second surface radially outward from said first surface relative to said axis, the second surface is covered with Teflon™, said tubular portion includes a reinforcing fiber embedded therein between the first and second surfaces, a dovetail portion including a rib portion and a retaining feature, said rib portion integral with said tubular portion and extending parallel to said axis, and said rib portion extending in a direction radially outward from said axis, said retaining feature is integral with and embedded into the rib portion and tapers toward said axis, said tubular portion and said rib portion are made of silicone rubber, each seal located in each said respective gap of each said respective inlet guide vane and extending from each said respective strut airfoil to each said respective flap airfoil thereof, thereby preventing the flow of said air through each said respective gap.

2. The method of claim 1 wherein the retaining feature is made of a rigid material.

3. The method of claim 2 wherein the retaining feature is made of metal.

4. A seal for a variable inlet guide vane of a gas turbine engine, said seal comprising:

a longitudinally extending tubular portion, said tubular portion having a longitudinal axis defined therethrough, said tubular portion comprising first and second surfaces, said surfaces in spaced relation to said axis and, said second surface radially outward from said first surface relative to said axis;

a dovetail portion including a rib portion and a retaining feature, said rib portion integral with said tubular portion and extending parallel to said axis, and said rib portion extending in a direction radially outward from said axis, wherein the retaining feature is embedded into the rib portion and tapers toward said axis, the tubular portion and the rib portion are made of silicone rubber, and the second surface of the tubular portion is covered with Teflon™.

5. The seal of claim 4 wherein the retaining feature is made of a rigid material.

6. The seal of claim 5 wherein the retaining feature is made of a metal.

* * * * *